H. WHITALL.
MACHINE FOR GRINDING CUTTERS OF HARVESTERS.
No. 3,109. REISSUED SEPT. 1, 1868.
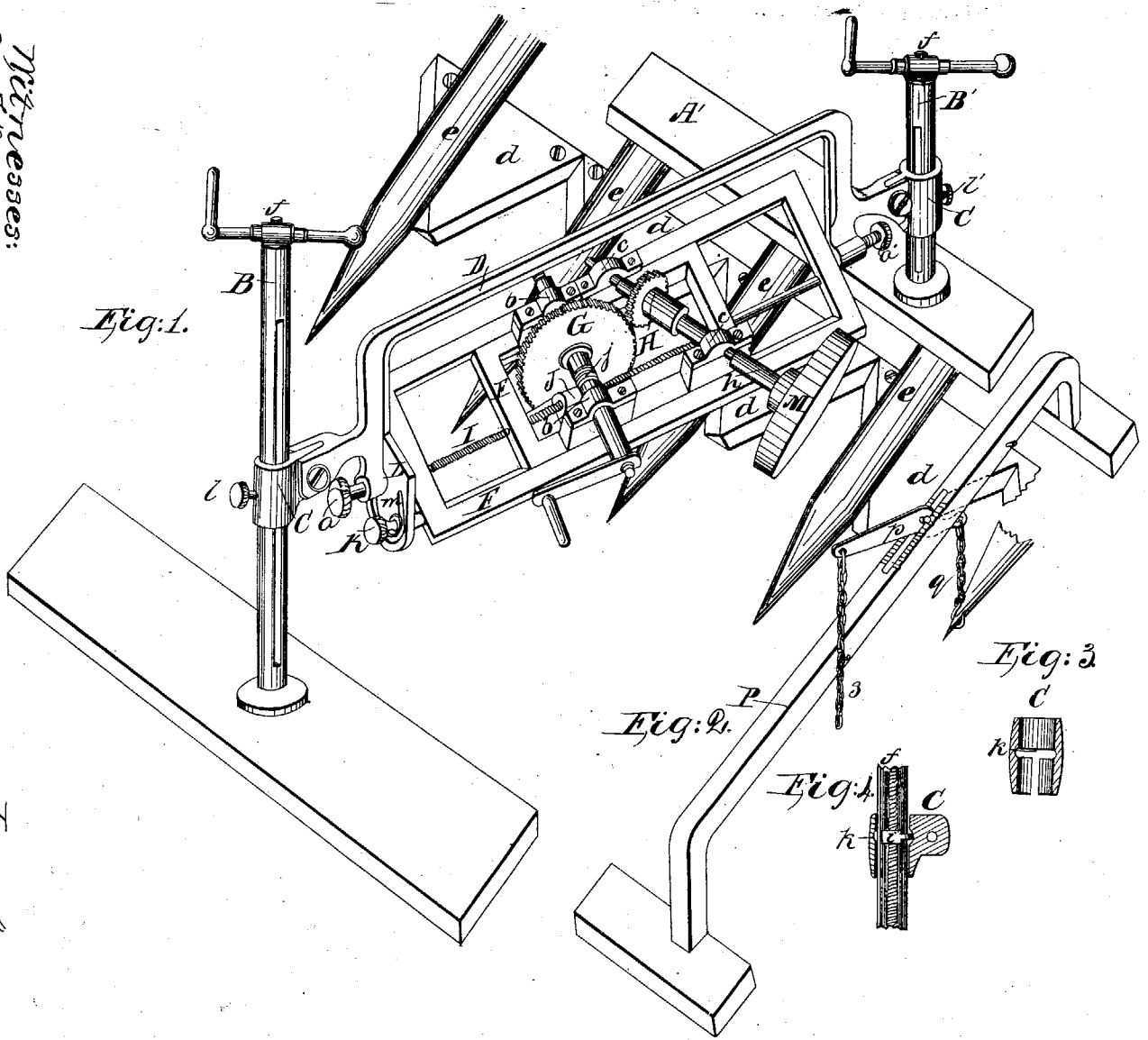
Witnesses:
Edw. T. Brown
C. Bestor
Inventor:
Henry Whitall

United States Patent Office.

HENRY WHITALL, OF WOODBURY, NEW JERSEY.

*Letters Patent No.* 64,817, *dated May* 14, 1867; *reissue No.* 3,109, *dated September* 1, 1868.

IMPROVEMENT IN MACHINE FOR GRINDING THE CUTTERS OF MOWING-MACHINES

The Schedule referred to in these Letters Patent and making part of the same.

TO ALL WHOM IT MAY CONCERN:

Be it known that I, HENRY WHITALL, of Woodbury, New Jersey, have invented an Improved Machine for Grinding the Cutters of Harvesters; and I do hereby declare that the following is a full and exact description thereof.

The object of my invention is to provide a cheap portable machine for grinding the cutters of harvesters and mowing-machines, that may be carried into the field easily by the operator to grind the cutters.

The common grindstone is now the only means employed to grind the cutters, which are either detached from the bar by removing their screws, or the cutter-bar is detached from the connecting-rod of the machine, withdrawn therefrom, and carried from the field to the house, or where the grindstone is to be found, the operator holding the cutters by hand against the stone, and grinding them in the usual manner of grinding tools.

In these machines it requires one person to turn the stone and another to hold the cutters being ground. Some of the frames of these grindstones have been provided with rests at one side, for one end of the bar, to somewhat assist the operator who holds the bar in keeping it at the proper bevel with the stone, but it has been found to be practically impossible to keep the bar and its bevelled-edged cutter in contact with the stone at the inclination to accord with the predetermined bevel. Owing to the difficulty experienced in holding the cutter-bar accurately and positively by hand, wabbling cannot be prevented.

Prior to my invention, no machine for this purpose had been constructed in which the face of the stone and edge of the cutters could be held together, or in contact mechanically and at the proper bevel.

The cutter-blades are of a triangular form, and their cutting-edges are bevelled, the bevel being first determined by the manufacturer, so as to present the best possible edge for the proper working of the cutters. This bevel should always be maintained in after grindings, and to do this it is necessary that the stone and cutter, when arranged at the proper bevel with each other, be held mechanically and firmly in contact, and that the mechanism be so constructed and arranged that by a simple reversal and adjustment of parts, the opposite bevelled edges of the blades and stone can be brought in contact to grind both edges of the blades.

A machine constructed after my invention may, by a slight adjustment only of its parts, be adapted to work against either inclined edge of the blades, and at an inclination to correspond with the existing bevel of the edges, and when so adjusted the stone and cutters may be pressed firmly in contact without any possibility of the angle of inclination or tangential contact of the stone and blades being changed, in this manner leaving the hands of the operator free to turn the stone, doing the grinding perfectly, and saving the labor of a second person.

The cutters may be ground with the bar in the machine, and other novel features of my invention are as follows:

Arranging the mandrel of the stone so that when in working position it will be in a vertical plane parallel with the cutter-bar.

Supporting the stone in bearings that may oscillate so that the stone and opposite edges of the cutters may be brought in contact and adjusted so that the face of the stone shall be parallel with the bevelled edge of the blades.

Arranging the wheel-supporting frame in supports so that it may be adjusted to move in a line parallel with either edge of the cutter-blades, and in a horizontal plane parallel with the face of the cutters.

Having thus generally described the nature and object of my invention, I will now proceed to describe more particularly the construction and operation of the same, reference being had to the accompanying drawings, in which—

Figure 1 represents a perspective view of my machine in position to grind the cutters on one edge, with the cutter-bar in the harvester ready for use.

Figure 2 represents a perspective view of the clamp.

Figure 3 represents a sectional view of one of the sleeves C, showing the annular groove *k*, and Figure 4 represents a section of one of the sleeves and posts, showing the screw *f* and nut *i*.

A and A′ are base-plates, to which the hollow slotted posts B and B′ are secured.

C and C′ are sleeves made to slide vertically on the said posts by means of screws *f* and nuts *i*. The nuts project through slots in the posts, and into annular grooves, *k*, in the sleeves C, or, in place of the screws *f* and nuts *i*, the sleeves may be adjusted by hand, and secured by set-screws *l l′*. Each sleeve has a projection extending horizontally from one side.

D is a bent support or frame jointed at each end to one of the sleeves by means of said projections.

E is an oscillating frame pivoted by screws *a* and *a′* to the support D.

F is a sliding frame, to which the shafts *g* and *h* are secured by journal-boxes *b* and *b′* and *c* and *c′*.

I is a long screw secured at both ends to the oscillating frame E.

*j* is a worm on shaft *g*, which communicates motion to a worm-wheel, (not seen,) which revolves in and is secured to nut J on sliding frame F. The said worm-wheel has a screwed hole through its centre, through which the screw I passes.

G and H are gears to communicate motion to shaft *h*.

M is the stone or vulcanite-wheel arranged upon the sliding frame at such an angle as will cause the sides of the stone to stand in a line at right angles with the cutter-bar of the mowing-machine.

L is a plate projecting downward from the front end of the main support D, having a curved slot, *m*.

K is a set-screw passing through the slot *m*, and screwing into a boss on the cross-bar of the oscillating frame E.

*e e e* represent the fingers of a mowing-machine.

*d d d* and *d* represent the cutters of the same.

P represents a clamp, of which *p* is a lever, having a chain, *q*, attached to its short arm, and another chain *s*, at its long arm, and it is fulcrumed in the grooves in the stock of the clamp adjacent to the mortise.

The operation is as follows:

The cutter-bar having been adjusted so that each one of the edges of all the cutters upon the same side is presented about midway of the spaces between the fingers, the base-plate A is then placed on the ground in front of the cutter-bar, and parallel with it.

The base-plate A′ is placed in a similar manner upon the machine directly in rear of the cutter. They are then adjusted so that the oscillating frame will stand in a line parallel with the edge of the cutter which is to be ground. The clamp P is then placed with one foot upon base-plate A, and the other on plate A′, in such a position that the hook *q* may be secured to one of the fingers, when the long arm of the lever is drawn down by the chain *s*, and secured to a pin in the beam of the clamp with sufficient force to secure the base-plates A and A′ firmly in their places.

The oscillating frame E is then adjusted upon its axis, so that the face of the stone on the under side is parallel with the bevelled edge of the cutter. The said frame is secured in this position by tightening up set-screw *k*. The sleeves C and C′ are then adjusted by the screws *f*, or the set-screws *l*, so that the sliding frame and oscilling frame are brought to a position parallel with the surface of the cutter, and at the same time the stone is made to bear on the cutter with sufficient force to perform the grinding of the same, when the operator, by applying motion to the shaft *g*, by crank, will cause the stone M to rotate and move in one direction, until it has reached one end of the cutter's edge, then by turning the crank in the opposite direction, this operation being repeated until the cutter is sufficiently sharpened. The clamp is then released, and the machine adjusted to the corresponding edge of the next cutter, and the same operation is repeated until all the cutters are sharpened on one edge.

The cutter-bar is then adjusted so that the opposite edges of the cutters are in the proper position between the fingers, and the base-plates A and A′ are placed so as to adjust the sides of the oscillating frame in a line parallel with the edges opposite to those already ground; when the set-screw *k*, being already loosened, the oscillating frame E is turned a half revolution on its axis, which will bring the grindstone in the same position relatively to the unground edges of the cutters. The operation is then proceeded with in the same manner as above described.

In consequence of the sides of the stone being presented at right angles to the cutter-bar, the stone will work closely into the angle between the cutters when they come together.

Having described my invention, what I claim as new, and desire to secure by Letters Patent, is—

1. A rotary grinding-wheel, for grinding the inclined bevelled edges of the cutters of harvesters and mowing-machines, on their bars, in combination with a frame, supporting the grinding-wheel and its shaft, and mechanism for holding the face of the stone, and cutters, adjusted to the desired or predetermined bevel, in contact, the combination and arrangement being such that the grinding-wheel and either of the opposite inclined bevelled edges of the cutters may be brought, when desired, together, and retained in contact, substantially as described, and for the purpose specified.

2. Also, the combination, in a frame, of a rotary grinding-wheel and an oscillating support, for changing the relative positions of the grinder and cutters, to operate on the opposite edges of the cutters, for the purpose set forth, 3. Also, the combination, in a frame, of a rotary and traversing grinding-wheel, and an oscillating support, for changing the relative positions of the grinder and cutters, to operate on the opposite edges of the cutters, for the purpose set forth.

4. Also, a rotary and traversing grinding-wheel, supported on a shaft, arranged angularly in the sliding frame, the position of the shaft in the frame being such that when the said sliding frame traverses parallel with the edge of the cutter, the mandrel will be parallel with the cutter-bar, substantially as and for the purpose described.

5. Also, a rotary grinding-wheel, supported on a traversing-frame, and arranged to be adjusted in a horizontal plane, parallel with the faces of the cutter-blades, substantially as and for the purpose described.

6. Also, the combination of the posts B and B′, provided with the sleeves C and C′, of the bent frame D, jointed to the sleeves and the oscillating frame, substantially as and for the purpose described.

7. Also, the combination, with the bent frame D, of the oscillating frame E, pivoted thereto, and provided with means for adjustment, substantially as and for the purpose described.

8. Also, the combination, with the sliding and oscillating frame, of the driving-shaft, grinder-carrying shaft, grinding-wheel, and their operating-mechanism, substantially as and for the purpose described.

9. Also, the combination, with the machine, substantially as described, of the clamp P, when arranged for joint action with the same, substantially as and for the purpose set forth.

10. Also, a grinding-mechanism, substantially such as described, operating to grind the cutters while in the machine.

The above specification of my invention signed by me, this seventh day of July, 1868.

HENRY WHITALL.

Witnesses:

EDM. F. BROWN,

E. M. BROWN.